Oct. 25, 1960 A. DUERKSEN 2,957,677
METHOD OF AND APPARATUS FOR REDUCING
THE DIAMETER OF A TIRE
Filed Feb. 24, 1959 2 Sheets-Sheet 1

INVENTOR.
Arnold Duerksen
BY
ATTYS

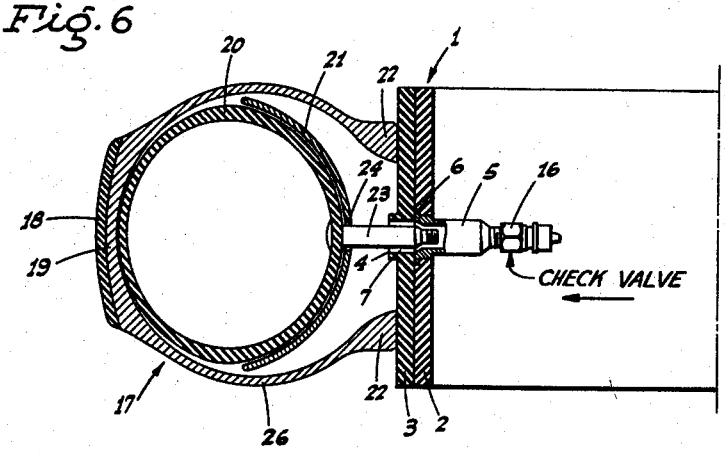
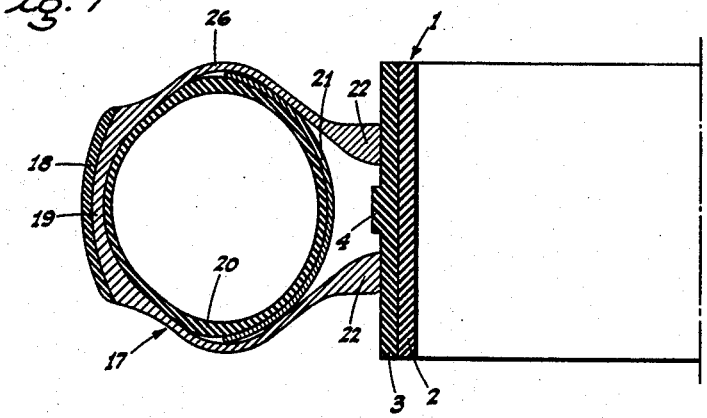
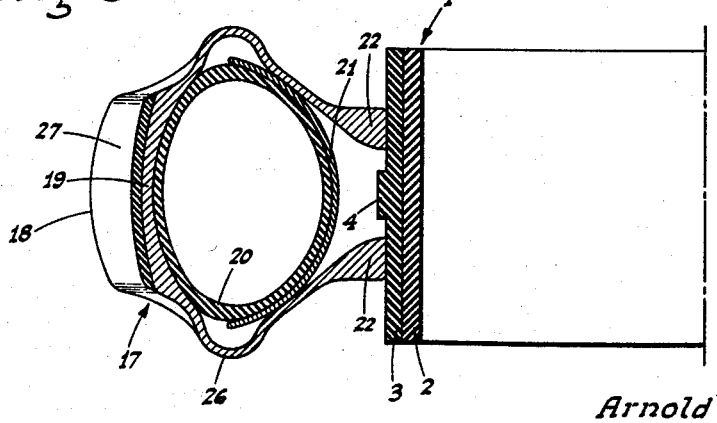

United States Patent Office

2,957,677
Patented Oct. 25, 1960

---

2,957,677

METHOD OF AND APPARATUS FOR REDUCING THE DIAMETER OF A TIRE

Arnold Duerksen, Lodi, Calif., assignor to Super Mold Corporation of California, Lodi, Calif., a corporation of California Filed Feb. 24, 1959, Ser. No. 794,986

18 Claims. (Cl. 254—50.3)

This invention relates to a novel method and apparatus particularly adapted for use in the tire retreading industry.

After a worn tire has been prepared for tread vulcanization, and at which time the tire includes a new but unvulcanized tread rubber or camelback on the crown, it is necessary to reduce the diameter of such tire in order to permit its ready and free insertion into the matrix of the retreading mold without scuffing such new tread rubber.

It is therefore the major object of this invention to provide a novel method of, and apparatus for, reducing the diameter of a tire and temporarily holding the tire in such reduced-diameter condition for insertion into the matrix of the retreading mold; such result being accomplished—essentially—by the creation of vacuum in the tire.

Another important object of the invention is to provide a method, for the purpose described, which includes the steps of establishing a closure extending between, and for sealing with, the beads of the tire, and then creating a vacuum in the tire while maintaining the tire sidewalls against collapsing laterally inwardly, but permitting of radially inwardly kinking or indenting of the tire at one or more points in the circumference thereof whereby the tire is substantially reduced in diameter.

An additional object of the invention is to provide novel apparatus, for the practice of the above method, which includes—in combination with a deflated inside curing bag, and a rigid inside curing rim in the tire—a closure and sealing rim on which the tire is engaged; such rim establishing the necessary closure between the tire beads, and the latter sealing with the rim upon the creation of vacuum in the tire through the medium of a connection on said rim adapted to couple to a vacuum device.

A further object of the invention is to provide a closure and sealing rim, as in the preceding paragraph, which is of flexible and resilient material, such as rubber; the outer or peripheral face of such rim being relatively soft so that the tire beads positively seal thereagainst under the vacuum in the tire.

It is also an object of the invention to provide such a closure and sealing rim which is simple in structure, economical to manufacture, and convenient to apply to—or remove from—a tire.

Still another object of the invention is to provide a practical and reliable method of, and apparatus for, reducing the diameter of a tire.

These objects are accomplished in the manner and by means of such structure as will fully appear by a perusal of the following specification and claims.

In the drawings:

Fig. 6 is an enlarged transverse section on line 6—6 of Fig. 2.

Fig. 7 is an enlarged transverse section on line 7—7 of Fig. 3.

Fig. 8 is an enlarged transverse section on line 8—8 of Fig. 5.

Figure 1:
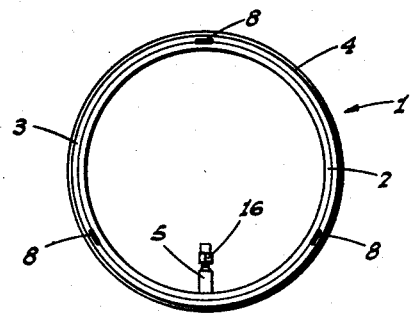
Fig. 1 is a plan view of the closure and sealing rim, detached.

Referring now more particularly to the drawings, and to the characters of reference marked thereon, the apparatus which is used in the performance of the method comprises a closure and sealing rim, indicated generally at 1, and which is in the form of an annular band or drum of substantial width in an axial direction.

The closure and sealing rim 1 comprises an inner circumferential lamination 2 of relatively stiff rubber, and an outer circumferential facing or lamination 3 of relatively soft rubber; the laminations 2 and 3 being vulcanized together. As so constructed, the rim 1 is relatively stiff but resilient, and has an outer or peripheral face which is relatively soft.

A central, circumferentially extending rib 4 is formed integral with, and projects outwardly from, the rim 1. At one point in the circumference thereof the rim 1 is provided with a radially inwardly projecting, tubular stem 5; such stem extending at its inner end through the inner lamination 2, and being provided with a retention flange 6; such stem communicating with a radial passage 7 which opens to the periphery of rim 1 through the outer lamination 3 and the central circumferential rib 4.

The rim 1 is normally used in a horizontal position, and at its then upper edge such rim is provided—at a plurality of equally circumferentially spaced points—with lifting eyes 8 adapted for connection to a suitable hoist.

The numeral 9 indicates a vacuum device in the form of an air ejector unit which includes an air pressure input fitting 10, a discharge nozzle 11, and a lateral suction or vacuum fitting 12. An air pressure supply hose 13 is connected to the input fitting 10 by a coupling 14, while the lateral suction or vacuum fitting 12 is connected to a two-part, quick-detachable coupling 15, and one part 16 of which coupling is threaded on—and remains in connection with—the stem 5. Such part 16 of the coupling 15 includes a check valve closing in a radially outward direction. The internal construction of the air ejector unit 9 and the coupling 15 are not shown, as the function of such devices will be fully understood from the foregoing description.

In use of the rim 1 to practice the herein claimed method, the tire 17 is first placed in a horizontal position and suitably supported; such tire having the new tread rubber or camelback 18 on the crown 19. A deflated inside curing bag 20, and a rigid inside curing rim 21 in backing relation to said bag, occupy a position in the tire radially outwardly of the beads 22 so that the latter are unobstructed. The inside curing bag 20 includes—as usual—a radially inwardly projecting stem 23 which extends through an orifice 24 in the inside curing rim 21.

Figure 2:
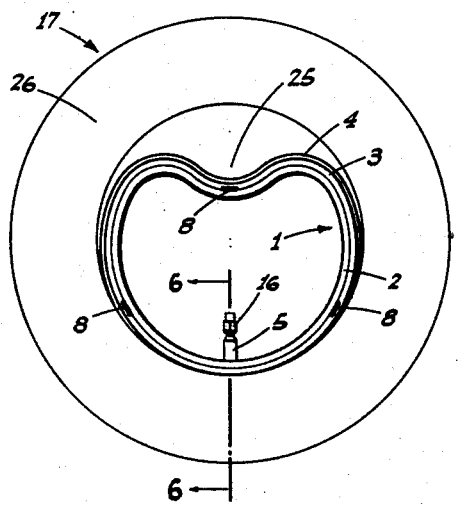
Fig. 2 is a plan view of such rim at being placed in a tire.

Nextly, the closure and sealing rim 1 is manually buckled radially inwardly from a point diametrally opposite the stem 5, as at 25, and the buckled rim is then placed in the tire—as shown in Fig. 2—with the stem 23 extending through passage 7 and into the stem 5, as shown in Fig. 6; the passage 7 and stem 5 being of an inside diameter relative to the outside diameter of stem 23 such that the latter has clearance thereabout as shown in Fig. 6.

After the rim 1 is placed in tire 17, the buckled portion 25 is sprung out, whereupon said rim 1 assumes its normal full-circle condition, and at which time the tire beads 22 firmly frictionally engage or seat on the relatively soft rubber facing 3 on opposite sides of—and a considerable distance from—the central circumferential rib 4. Such frictional engagement of the tire beads 22 with the facing 3 is enhanced by reason of the fact that rim 1 is of a slightly greater normal outside diameter than the inside or bead diameter of the tire.

After the rim 1 is engaged in the tire 17, with the beads 22 seating on the facing 3, the coupling 15 is engaged, which places the air ejector unit 9 in suctional relation to the stem 5. This is followed by air being fed under relatively high pressure through the hose 13 to the air ejector unit 9; the latter functioning to create a substantial vacuum not only within the tire 17, but also in the inside curing bag 20 whose stem 23 opens into the stem 5.

Figure 3:
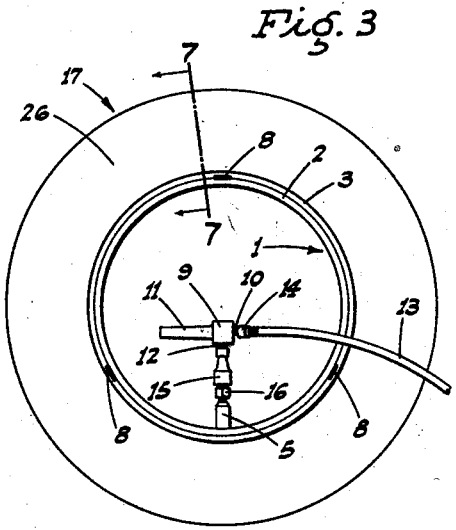
Fig. 3 is a plan view of the vacuum rim as engaged in the tire, and with the vacuum device coupled to the rim stem; the tire being shown as initially slightly lessened in diameter under the vacuum therein.

Upon creation of such vacuum in the tire 17, the beads 22 slide inwardly—i.e. in an axial direction—on the facing 3, and toward the central circumferential rib 4, and which rib in certain instances serves as a stop for such beads. As the beads 22 so slide on the facing 3, the sidewalls 26 of the tire 17—which are prevented from radially inward collapsing by the adjacent portions of the inside curing rim 21—are drawn downwardly or generally radially inwardly about such portions of the inside curing rim; such action pulling the crown 19—and camelback 18 thereon—inwardly to some extent. This accomplishes an initial reduction in the outside diameter of the tire (see Figs. 3 and 7). When the beads 22 reach the limit of their movement toward the rib 4, such beads—under the vacuum in the tire—positively seal against said facing 3.

Figure 5:
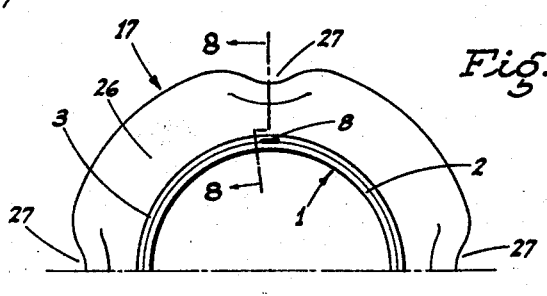
Fig. 5 is a half-plan view of the tire as radially inwardly kinked or indented at circumferentially spaced points.

Such initial reduction in the outside diameter of the tire is accompanied—in tires which are relatively pliable—by the tire kinking or indenting radially inwardly at one or more points in the circumference thereof, as at 27 (see Figs. 5 and 8). With such radially inward kinking or indenting 27 of the tire, its outside diameter is further reduced, and to an extent such that the tire 17 can be inserted into the matrix of the retreading mold readily and freely, and without any scuffing of the new tread rubber or camelback 18.

In order to insert the reduced-diameter tire into the matrix of a retreading mold, the coupling 15 is separated and the air ejector unit 9 removed; the part 16 of said coupling 15—and which part includes the radially outwardly closing check valve—then holding the vacuum in the tire and the latter in its reduced-diameter condition.

The rim 1 and the reduced-diameter tire 17 thereon are then picked up as a unit by engaging a hoist with the eyes 8, and which hoist is then employed to place the tire into the matrix of the retreading mold. The central circumferential rib 4 prevents the rim 1 from accidentally slipping upwardly out of the tire as it is being hoist-transported to the retreading mold. After such placement of the tire in the retreading mold, the rim 1 is merely pulled radially inwardly, at one point, away from the adjacent bead 22, which breaks the vacuum in the tire and permits the latter to radially expand—full circle—into the matrix. Finally, the rim 1 is again buckled, as at 25, and removed from the tire.

When the tire, by reason of its cord structure, is not pliable—i.e. is very stiff—the radially inward kinking or indenting 27 may not occur merely under the vacuum in the tire, and to form such kinks or indentations it is necessary—after the vacuum is created in the tire—to strike the latter at circumferentially spaced points in the periphery; such striking resulting in the formation of the desired kinks or indentations 27 in the tire at such points. The vacuum in the tire not only produces such kinks or indentations when the tire is struck at the periphery, but also then holds the tire in such condition.

Figure 4:
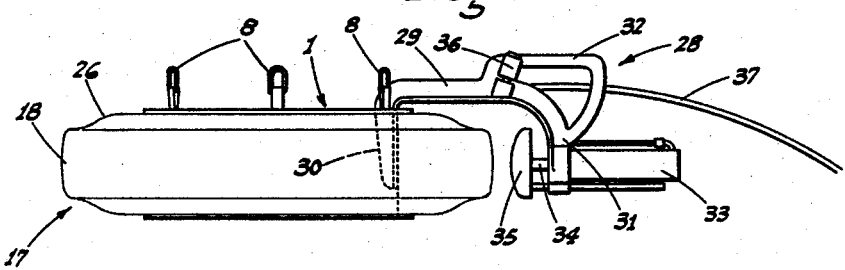
Fig. 4 is an elevation of the tire, as in Fig. 3, with the kinking of indenting unit in position for use.

When such striking of the tire at the periphery is required it is preferably accomplished by a tire indenting unit, indicated generally at 28, and as shown in side elevation in Fig. 4 in its position of use.

The tire indenting unit 28 comprises a generally C-shaped body 29 having an outer leg 30, an inner leg 31, an upstanding handle 32, and a power cylinder 33 mounted in connection with the inner leg 31 and projecting in a direction away from the outer leg 30. Such power cylinder 33 includes a piston rod 34 which projects toward the outer leg 30, and at its exposed end such piston rod 34 carries a bumper head 35. When the piston rod 34 is retracted the bumper head 35 is relatively close to the inner leg 31.

In use of the tire indenting unit 28, the generally C-shaped body 29 is disposed in straddling relation to the tire 17, with the outer leg 30 abutted against the rim 1, and with the bumper head 35 spaced from the periphery of the tire. By means of a finger-actuated valve 36 on unit 28, air pressure from a supply hose 37 is fed to the cylinder 33, causing the piston rod 34 to forcefully advance, whereupon the bumper head 35 strikes the periphery of the tire to produce one of the kinks or indentations 27.

The cylinder 33 is double-acting, and the valve 36 is operative to cause such cylinder to either advance or retract the bumper head 35, selectively.

The tire indenting unit 28 is used at as many circumferentially spaced points about the tire 17 as necessary to produce the kinks or indentations 27 in a number sufficient to reduce the outside diameter of the tire to the desired extent.

From the foregoing description it will be readily seen that there has been produced such a method of, and apparatus for, reducing the diameter of a tire, as will substantially fulfill the objects of the invention, as set forth herein.

While this specification sets forth the present and preferred details of the method—and the apparatus for practicing the same—still in practice such deviations therefrom may be resorted to as do not form a departure from the spirit of the invention, as defined by the appended claims.

Having thus described the invention, the following is claimed as new and useful, and upon which Letters Patent are desired:

1. A method of temporarily reducing the diameter of a tire, comprising the steps of closing the interior of the tire to atmosphere, maintaining the tire sidewalls against laterally inward collapse, and then creating a vacuum in the tire.

2. A method of temporarily reducing the diameter of a tire, comprising the steps of establishing a closure between the tire beads, maintaining the tire sidewalls against laterally inward collapse, and then creating a vacuum in the tire.

3. A method of temporarily reducing the diameter of a tire, comprising the steps of establishing a closure between the tire beads, maintaining the tire sidewalls against laterally inward collapse and with the tread of the tire free for radially inward kinking, and then creating a vacuum in the tire.

4. A method of temporarily reducing the diameter of a tire, comprising the steps of establishing a vacuum sealing closure between the tire beads and which permits of relative approaching movement of said beads, maintaining the tire sidewalls free for radially inward movement but against laterally inward collapse, and with the tread of the tire free for radially inward kinking, and then creating a vacuum in the tire.

5. A method of temporarily reducing the diameter of a tire, comprising the steps of establishing a closure between the tire beads, maintaining the tire sidewalls against laterally inward collapse, then creating a vacuum in the tire, and finally imparting a tread kinking impact to the periphery of the tire.

6. A method of temporarily reducing the diameter of a tire, comprising the steps of establishing a vacuum sealing closure between the beads of the tire and which permits of relative approaching movement of said beads, maintaining the tire sidewalls free for radially inward movement but against laterally inward collapse, and with the tire tread free for radially inward kinking, then creating a vacuum in the tire, and finally imparting a tread kinking impact to the tire at one or more points in the periphery thereof.

7. Apparatus, for use in the temporary reduction of the diameter of a tire, comprising means adapted to engage with the tire to seal the interior thereof to atmosphere, means to establish vacuum in the tire after engagement of said first named means therewith, and means in the tire to maintain the sidewalls of the tire against laterally inward collapse.

8. Apparatus, for use in the temporary reduction of the diameter of a tire, comprising an annular rim adapted to engage with the tire to provide a closure between and a seal for the tire beads, the face of the rim being of a material with which the beads seal in response to vacuum in the tire, means to establish vacuum in the tire after engagement of the rim therewith, and means in the tire to maintain the sidewalls of the tire against laterally inward collapse.

9. Apparatus, as in claim 8, in which the rim comprises an outer lamination of relatively soft rubber, and an inner lamination of relatively stiff rubber; the outer lamination providing said sealing face.

10. Apparatus, as in claim 8, in which said means includes a stem opening through and projecting radially inward from the rim, and a vacuum device adapted for connection to the stem.

11. Apparatus, for use in the temporary reduction of the diameter of a tire, comprising an annular rim adapted to engage with the tire to provide a closure between and a seal for the tire beads, the rim being flexible and resilient and having a relatively soft face with which the beads seal in response to vacuum in the tire, means to establish vacuum in the tire after engagement of the rim therewith and means in the tire to maintain the sidewalls of the tire against laterally inward collapse.

12. Apparatus, for use in the temporary reduction of the diameter of a tire, comprising an annular rim adapted to engage with the tire to provide a closure between and a seal for the tire beads, the rim being a relatively wide, flat faced, flexible and resilient band, the beads sealing with such face in response to vacuum in the tire, means in the tire to maintain the sidewalls of the tire against laterally inward collapse, and a stem opening through the band and projecting radially inward therefrom for connection with a vacuum device.

13. Apparatus, for use in the temporary reduction of the diameter of a tire, comprising an inside curing bag backed by an inside curing rim in the tire, an annular outside rim adapted to engage with the tire to provide a closure between and a seal for the tire beads, the face of said outside rim being of a material with which the beads seal in response to vacuum in the tire, and means to establish vacuum in the tire after engagement of the outside rim therewith.

14. Apparatus, for use in the temporary reduction of the diameter of a tire, comprising an annular rim adapted to engage with the tire to provide a closure between and a seal for the tire beads, the face of the rim being of a material with which the beads seal in response to vacuum in the tire, means to establish vacuum in the tire after engagement of the rim therewith, means in the tire to maintain the sidewalls of the tire against laterally inward collapse, and a power device adapted to be mounted in association with the tire to impart a tread kinking impact to the periphery of said tire while the latter is mounted on the rim and under vacuum.

15. Apparatus, as in claim 13, in which the inside curing bag and the outside rim each includes a radially inwardly projecting stem; the stem of the inside curing bag extending into the stem of the outside rim in clearance relation.

16. Apparatus, as in claim 15, with a check valve in said stem of the outside rim closing radially outwardly.

17. Apparatus, as in claim 14, in which said power device comprises a C-shaped body adapted to straddle the tire and rim and having an outer leg and an inner leg spaced apart so that when the outer leg is engaged with the rim the inner leg will be spaced a material distance from the tread of the tire, a power cylinder mounted on the inner leg and projecting away from the tire at right angles to the outer leg, a piston rod slidable in the cylinder and projecting outwardly with the space between the inner leg and the tire, and a bumper head for engagement with the tread of the tire secured on the outer end of the piston rod.

18. A method of preparing a tire for placement into a retreading mold comprising the steps of closing the interior of the tire to atmosphere, preventing lateral inward collapse of the sidewalls of the tire whereby the overall diameter of the tire will be reduced, then creating a vacuum in the tire, and maintaining the tire under such vacuum until after it is placed in the mold.

References Cited in the file of this patent

UNITED STATES PATENTS

| | | |
|---|---|---|
| 1,349,721 | Hopkinson | Aug. 17, 1920 |
| 1,405,427 | Ofensend | Feb. 7, 1922 |
| 1,777,405 | Frank | Oct. 7, 1930 |
| 1,906,502 | Abbott | May 2, 1933 |
| 2,525,114 | Branick | Oct. 10, 1950 |
| 2,694,247 | Rose | Nov. 16, 1954 |
| 2,919,892 | Hawkinson | Jan. 5, 1960 |